Nov. 22, 1932.    L. VERKUIL    1,888,895
STONE CUTTING MACHINERY
Filed May 1, 1930    2 Sheets-Sheet 1
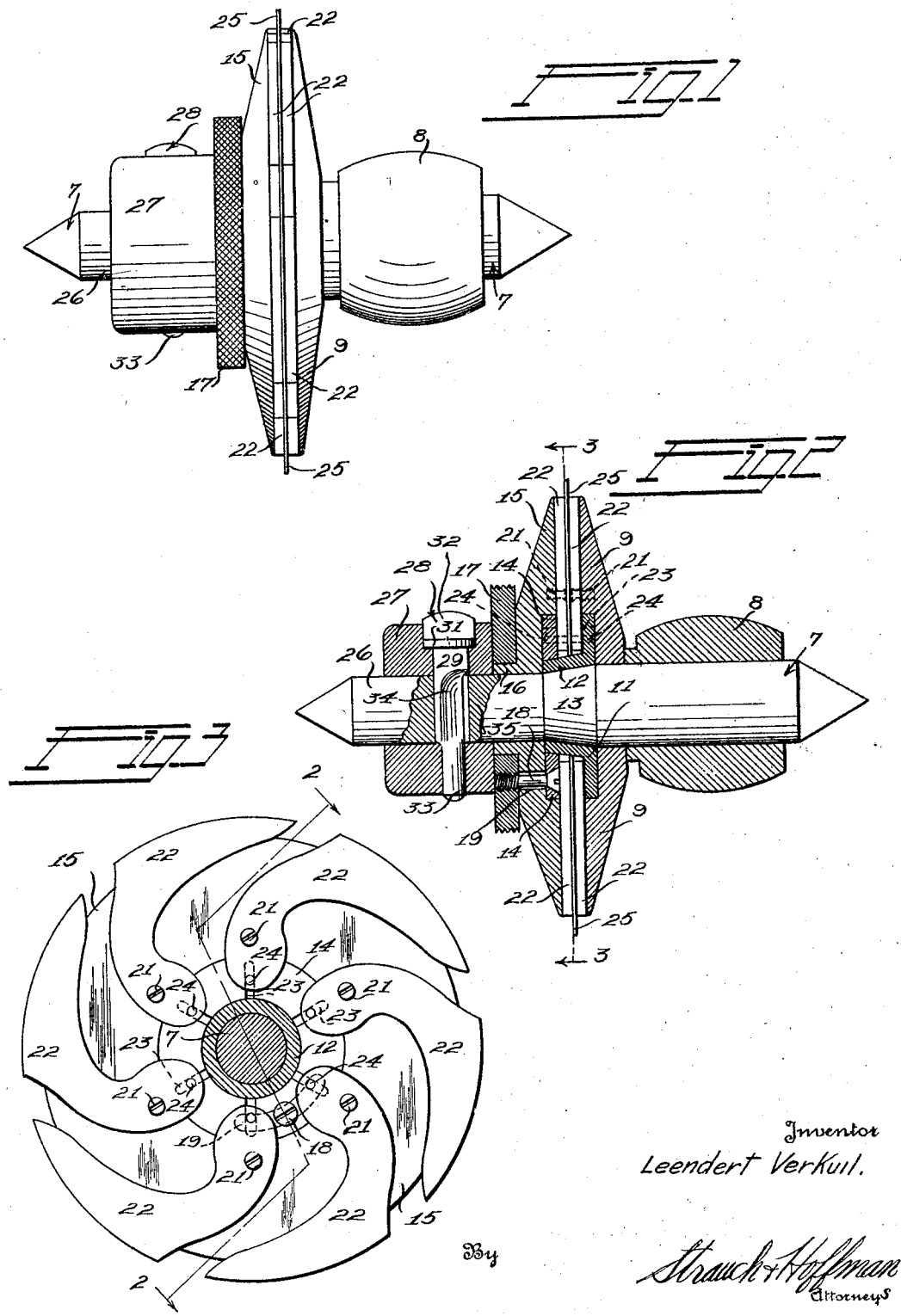
Inventor
Leendert Verkuil.
By
Strauch & Hoffman
Attorneys Nov. 22, 1932.     L. VERKUIL     1,888,895
STONE CUTTING MACHINERY
Filed May 1, 1930     2 Sheets-Sheet 2
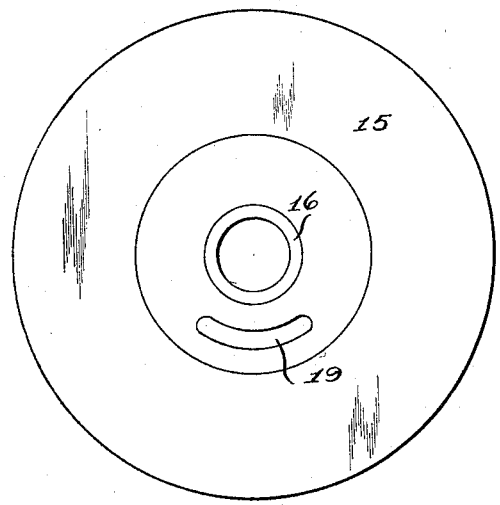
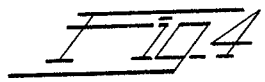
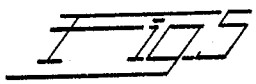
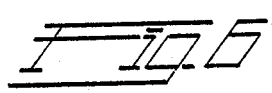
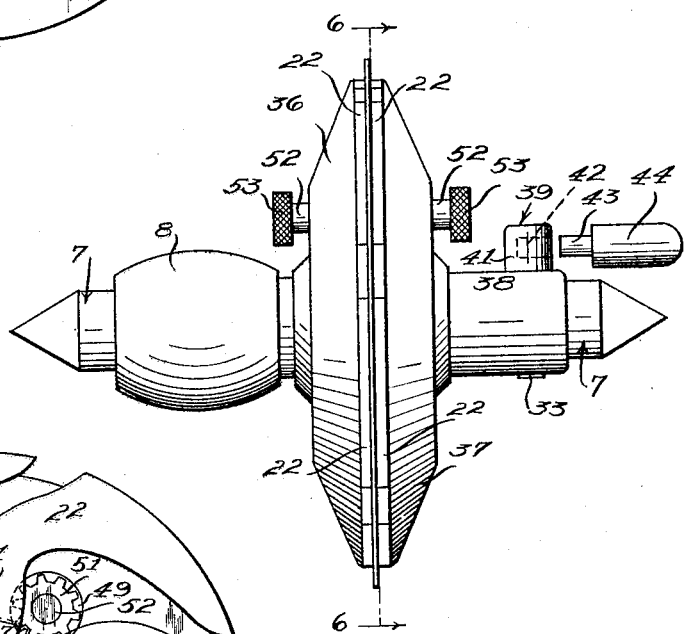
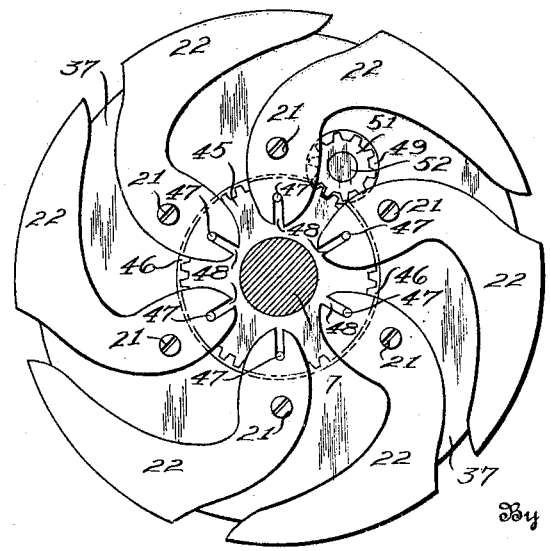
Inventor
Leendert Verkuil.
By
Strauch & Hoffman
Attorneys Patented Nov. 22, 1932

1,888,895

UNITED STATES PATENT OFFICE

LEENDERT VERKUIL, OF STATEN ISLAND, NEW YORK

STONE CUTTING MACHINERY

Application filed May 1, 1930. Serial No. 449,031.

This invention relates to improvements in cutting or sawing machines, particularly machines for sawing diamonds and other similar stones.

In conventional diamond sawing machines used at the present time it is common to mount a circular saw between a pair of flanges, this assembly being carried upon a rotatable spindle, with the cutting edge of the saw extending beyond the peripheries of the flanges. The extending edge (annular cutting portion) of the saw must be of such size as to operate upon a stone of predetermined proportions. The supporting flanges are separable to permit interchangeability of saws of various sizes, a thicker saw being substituted whenever a larger stone is to be cut, and vice versa.

The flanges (still referring to the conventional machine) are of fixed size and hence, unless frequent substitution of saws is made, the extending peripheral edge of the saw will not be of proper size and thickness for varying cutting conditions. When sawing a diamond of, say, $\frac{3}{8}$ inch diameter, the saw must extend about $\frac{7}{16}$ inch beyond the flanges. But a saw must be relatively thick in order to permit so great an extension, for otherwise its cutting edge would be overly flexible and bound to buckle and jam itself into the diamond. It is, of course, desirable to use a very thin saw (0.002 inch, or even thinner) in order to make a thin cut and thereby reduce the loss of weight and material of the diamond. However, such thin saws can be used only when their diameters are but slightly greater than that of the flanges between which they are to be clamped. Consequently a diamond cutter, if he wishes to avoid excessive waste of material, must either use interchangeable saws in a special machine having a movable work support, or have several independent conventional machines of different size at his disposal, or must do his cutting with a single very thin saw of large diameter and which has a tendency to buckle and jam during operation. In order to employ saws of varying sizes and yet all of a minimum thickness, it becomes necessary to provide a separate flange and spindle assembly for mounting each particular saw in a conventional cutting machine. And if a special single machine were used, the frequent difficult changes would be burdensome. These alternatives, therefore, are expensive, inconvenient and highly undesirable.

Accordingly, it is a primary object of the present invention to provide a cutting machine, or equipment therefor, which will permit the interchangeability of a plurality of thin saws of various or uniformly standard diameters and of minimum thicknesses, in a single machine. More specifically, it is an object of this invention to devise means for mounting a circular saw, which means is adjustable to vary the distance which the peripheral edge of the saw freely extends beyond said mounting means. With still greater particularity, it is an object of my invention to provide mechanism for gripping and strengthening circular saws, which mechanism is adjustable radially relative to the saw center to vary the diameter of that portion of the saw gripped and strengthened by said mechanism. The ultimate result of these objects, when carried into effect, is to minimize the quantity of fine particles sawed away during the cutting operation.

I am aware of the fact that stationary guides, separate and apart from the rotating spindle mechanism, have been proposed for guiding and stabilizing the free peripheral edges of circular saws. Such guides, however, must be sufficiently spaced apart to permit the saw to rotate freely therebetween, and will not eliminate buckling and excessive vibration of the peripheral edges of relatively thin saws.

Another major object of the present invention resides in the provision of mounting means for a detachable circular saw which will automatically center the saw and cause it to run true when secured in operating position.

A further important object of this invention consists in providing, in mounting mechanism for a removable circular saw, a conveniently operable and quick acting device for clamping and holding the saw in running position.

Other objects of my invention will appear in the following detailed description and the accompanying drawings. In said drawings:

Figure 1 is a front elevational view of one form of a saw and spindle assembly, constructed in accordance with the present invention and designed for use in a sawing machine such, for example, as a diamond cutting machine.

Figure 2 is a longitudinal section through the device of Figure 1, taken substantially along the irregular line 2—2, Figure 3, looking in the direction of the indicated arrows.

Figure 3 represents a cross section through the same apparatus, as seen when looking in the direction of the arrows upon the plane designated by line 3—3, Figure 2, but with the radially adjustable elements expanded to project beyond the clamping flanges.

Figure 4 is a detail view in end elevation of the removable flange of Figures 1–3.

Figure 5 is an elevational view, corresponding to Figure 1, of a modified form of the spindle and saw assembly of the present invention.

Figure 6 is a vertical section taken upon the plane indicated by line 6—6, Figure 5, but with the radially adjustable elements swung outward to a position beyond that indicated in Figure 5.

With further reference to the drawings, in which like numerals are employed to designate like parts, and with particular reference to Figures 1–4, numeral 7 indicates a spindle upon which there is mounted a cutting mechanism about to be described. The spindle is adapted to have its ends rotatably supported in the framework of any conventional cutting machine (not shown), and rigidly carries on one end a pulley 8 or any other suitable device through which the spindle may be rotatably driven.

Intermediate its ends the spindle carries a circular flange 9 which abuts the pulley 8 and is rigidly mounted for rotation in unison with the pulley and spindle. The inner (left) side of this flange is flat, and annularly recessed to receive an annular plate 11 which forms an end portion of a conical sleeve 12 journaled on a frustro-conical surface 13 of the spindle 7. The opposite end of sleeve 12 detachably receives an annular collar in the form of a plate 14. The left end (Figure 2) of the spindle receives a circular flange member 15, similar in shape and of the same diameter as flange 9, which flange member has a flat side turned toward flange 9 and recessed to receive and abut the plate 14 and the end of sleeve 12. The other (left) side of member 15 has an integral sleeve extension 16 of cylindrical formation upon which is rotatably mounted a knurled ring 17.

A pin comprising a screw 18 or the like extends through plate 14, thence through a slot 19 in the flange 15 and then into the ring 17. Slot 19 is concentric with the spindle 7 and the extension 16 and, limited by the length of the slot, rotation of the plate 14, may be obtained by turning the knurled ring 17. Plate 14 normally fits upon sleeve 12 tightly enough to cause simultaneous rotation of plate 11 with plate 14. This mechanism provides an adjustment which will be understood from the following further description.

The flat surface of flange 15 has pivotally connected thereto, as by countersunk screws 21, a plurality of expanding and contracting plates 22 (see especially Figure 3). These plates are of special shape and are angularly spaced apart. Their outer ends are of a cylindrical curvature approximating that of the peripheries of flanges 9 and 15 and normally extend slightly beyond said peripheries. The screws 21, which freely pass through the intermediate portions of the plates 22 and are anchored in the flange 15, are spaced apart and equidistantly positioned from the axis of the spindle. The inner ends of the special plates 22 terminate adjacent the sleeve 12 and it will be observed that, should these ends be oscillated to rock the plates about the screws, the outer cylindrical ends of plates 22, due to the bent shape of the latter, would move substantially radially toward or from (depending on the direction of oscillation) the peripheries of flanges 9 and 15. Provision is made for this movement in response to manual oscillation of knurled knob 17 and collar plate 14, as follows:

A set of spaced radial slots 23, corresponding in number to the plates 22, is cut in the collar plate 14, and a set of pins 24 (one individual to each plate 22 and slot 23) is carried by the plates 22, the pins being of such length and size as to project freely into the slots.

A similar set of plates 22, screws 21, slots 23, and pins 24 are disposed in substantially identical manner adjacent the flat side of the other flange 9. This assembly is opposed to and coincident with that just described and, since the collar plate 14 has a frictional fit upon the conical sleeve 12, the plates 11 and 14 will oscillate together in response to any oscillation of the adjusting ring 17, thus causing both sets of plates 22 to move radially through equal distances at all times.

A circular saw 25, which may be a conventional copper disc of the type used for diamond cutting, is mounted with a snug, self-centering fit upon the sleeve 12, the body of the saw being disposed between the two sets of plates 22. A reduced end 26 of the spindle 7 projects beyond the flange 15 to slidably receive a clamping collar 27. Instead of screw-threading this collar upon the spindle so that it may be tightened to force the elements 11, 14, 15, 17, 22 and 25 toward the flange 9 to maintain all of such elements in locking engagement for sawing operation, I provide, for accomplishing this purpose, a conveniently manipulated and quick-acting clamping device, as follows:

The clamping collar 27 is specially drilled to rotatably receive an irregularly shaped clamping pin 28. This pin comprises a main cylindrical body 29 having an integral collar 31, a head 32 adapted to be gripped by a key or wrench (not shown) to be oscillated thereby, a reduced cylindrical end 33 concentric with respect to body 29, and an eccentric portion 34 joining the body 29 and the end 33. As shown in Figure 2, one side (about 90° of the left surface) of portion 34 constitutes a continuation of body 29 and the remaining surface (about 270°) constitutes a continuation of the reduced end 33. Portion 34 is of the same length as a transverse hole 35 that is drilled through the spindle to receive said portion, this hole being of the same diameter as (or slightly larger than) that of the pin body 29. With the pin 28 in the position shown in Figure 2, the parts of the saw and spindle assembly are tightly clamped together but, should the pin be oscillated through an angle of substantially 90° or greater, it will be observed that the collar 27 will be permitted to move axially toward the left with respect to the spindle, thereby loosening the entire assembly sufficiently to permit adjustment of the special plates 22 through manipulation of the knurled ring 17.

Assuming that the device is dismounted from the cutting machine for the insertion of a saw, the assembling and operation of the apparatus is as follows:

The spindle 7, pulley 8, flange 9 with its adjustable plates 22, and the sleeve 12 are rarely, if ever, dissassembled and hence they form the foundation unit of the assembly. A thin saw 25 of predetermined size is then selected and passed over the spindle end 26 and onto the frusto-conical sleeve 12. The flange 15, together with its plates 22, collar 14, and ring 17, is then slid along the spindle into engagement with the saw 25 and sleeve 12. After this operation, the collar 27 is mounted on spindle section 26 with its drilled passages in substantial alignment with hole 35, and the clamping pin 28 is dropped freely into place. With the parts in this unclamped position, the ring 17 may be adjusted to set the plates 22 to proper position, this position depending partly upon the size of the stone to be cut but mainly upon the diameter of the saw.

It will be seen that extremely thin saws, of much greater diameter than the flanges 9 and 15, may be used, since the plates 22 may be rocked to extend their cylindrically curved ends well beyond the flanges, in this manner strengthening and supporting so great a portion of the saw that the cutting edge of the latter will be unable to wobble or vibrate.

Figure 3 shows the plates 22 in a position wherein they are expanded beyond that of Figure 2. This is an intermediate position, the screws 21 and pins 24 being intersected by radial lines from the spindle axis. By rotating the plates 11 and 14 clockwise in Figure 3, the pins will slide radially outward in their slots and at the same time rock the plates 22 counterclockwise to further increase the effective diameter of the plate assemblies (22). The plates 22 are contracted by rotation of the plates 11 and 14 in a reverse direction.

It should be understood that one of the plates 11 or 14 may be dispensed with, if desired, by lengthening the pins 24 individual to the other plate so that such pins project through the saw into the plates 22 on the opposite side of the latter. In making this change it will, of course, be necessary either to increase the size of the central opening in the saw or to provide appropriate slots in the saw to receive the elongated pins 24.

Having adjusted the plates 22 to proper position, the clamping pin 28 is then turned into the position illustrated in Figure 2 to lock the entire mechanism as a unit upon the spindle, at which time the opposed sets of plates 22 firmly engage the saw 25. During this clamping operation the saw, its central hole being relatively small with respect to the frustro-conical sleeve 12, was forced along the inclined surface of the latter to positively center and "true" itself. The spindle and saw assembly is now inserted in the machine for performing cutting operations in the usual manner. Adjustments of the plates 22 may be quickly made at will, as may also the substitution of other saws.

In Figures 5 and 6 there is illustrated a modified form of device which, though differing in certain structural details, is substantially the same in principle as that of Figures 1–4. It comprises a spindle 7, pulley 8, a pair of flanges 36 and 37 corresponding to flanges 9 and 15 of Figures 1–4, a plurality of adjustable jaw plates 22 pivoted on the flanges by pins 21, a clamping collar 38, a clamping pin 39 and mechanism (to be described) for adjusting the plates 22. The clamping collar 38 directly abuts flange 37 and is provided with an eccentric pin 39, exactly like pin 28 of Figure 2 except for the provision of a special head 41 having a recess 42 adapted to receive the shank 43 of a clamping key or tool 44.

The adjusting plates 11 and 14 of Figures 1–4 are replaced in the present instance by a pair of flat gears 45 (see Figure 6), each of which is rotatably mounted on the spindle and freely nested within a cylindrical recess 46 in the flat side of its corresponding flange, 36 or 37. The gears 45 and plates 22 are interconnected by means of a set of pins 47 secured to the gears and slidably projecting into slots 48 in the plates. This is the reverse arrangement of that illustrated in Figures 1–4, but it will be observed that oscillation of gears 45 will cause radial adjustment of plates 22 in substantially the same way that the latter were actuated in by plates 11 and 14 in Figures 1-4. The mechanism for oscillating the gears is as follows:

The flat side of each flange (36 or 37) has a small cylindrical recess 49, approximately tangent to the larger recess 46 and receiving a pinion 51 that is in meshing engagement with a gear 45. This pinion is fixed upon an actuating shaft 52 that is journaled through the corresponding flange and provided, exteriorly of the latter, with a knurled manipulating knob 53 (see Figure 5). Although I have disclosed a pair of knobs 53 and duplicate mechanism therefor, it will readily be understood that the gears 45 might be interconnected by a sleeve (12) of the type shown in Figure 2, and the entire mechanism actuated by a single set of elements 51, 52 and 53.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:—

1. A rotatable unit of the character described, comprising a circular saw mounted between a plurality of radially adjustable elements, means for adjusting said elements to vary the distance through which the periphery of said saw projects beyond said elements, and beans for forcing said elements into engagement with said saw.

2. In the combination defined in claim 1, said forcing means comprising a pair of radially extending substantially annular flanges receiving said elements and said saw therebetween.

3. In a device of the character described, a rotatable spindle, a cutting disc mounted on said spindle for rotation therewith, strengthening plates having radially adjustable ends engaging said disc adjacent the periphery of the latter, and means for actuating said plates to effect a substantially radial adjustment of the ends thereof.

4. In the device set forth in claim 3, means for forcing said plates against the surfaces of said disc, said forcing means comprising a member longitudinally fixed on said spindle and abutting the plates on one side of said disc, a longitudinally slidable member abutting the plates on the other side of said disc, and means for thrusting said slidable member along the spindle toward said fixed member.

5. In a device of the character described, a spindle, a pair of flanges mounted upon said spindle, a cutting disc mounted between said flanges, a plurality of curved holding elements for said disc, said elements being pivoted upon said flanges and having their outer ends terminating adjacent the periphery of said disc, and adjusting means for swinging said elements about their pivots to move said outer ends in a substantially radial direction.

6. In the combination specified in claim 5, said adjusting means comprising an actuator connected to said elements, a control member disposed on the outside of said flanges for convenient manipulation, and mechanism interconnecting said member and said actuator.

7. In combination, an oscillatable plate, a centering member connected to said plate, said member having a frustro-conical surface a cutting disc mounted upon said frustro-conical surface of the centering member, a plurality of elements for holding and strengthening said disc, said elements being adjustable in response to oscillation of said plate, and means for actuating said plate.

8. In the combination defined in claim 7, a second plate carried by said centering member for oscillation therewith, one of said plates being removable from said member to permit interchangeability of cutting discs, and means for forcing said plates toward each other to center said disc upon said frustro-conical surface and to clamp it between certain of said holding elements.

9. In combination, a spindle, a saw mounted upon said spindle, two sets of radially adjustable holding elements for the saw, one set of said elements being fixed against movement longitudinally of said spindle, and the other set being longitudinally adjustable, a collar surrounding said spindle and movable with said adjustable set of elements, and a quick-clamping member projecting through said collar into the spindle, said clamping member being rotatable and provided with means to force said adjustable set of elements axially of said spindle towards said fixed set of elements.

10. Cutting or sawing mechanism of the character described, comprising an extremely thin cutting disc, means for holding and strengthening said disc adjacent the periphery thereof, said means being adjustable to vary the distance between itself and the outer periphery of the disc, and mechanism for effecting said adjustment of said means.

11. In a device of the character described, a spindle, a pair of flanges mounted upon said spindle, a cutting disc mounted between said flanges, a plurality of curved holding elements for said disc, said elements being pivoted upon said flanges and having their outer ends terminating adjacent the periphery of said disc, adjusting means for swinging said elements about their pivots to move said outer ends in a substantially radial direction, one of the aforementioned flanges being slidable longitudinally of said spindle, a collar slidably mounted upon said spindle adjacent said slidable flange, and means associated with said collar and spindle for thrusting said slidable flange toward said disc.

12. In the combination specified in claim 11, said adjusting means including a sleeve surrounding said spindle and projecting through said disc centrally thereof, said sleeve having a frusto-conical surface engaging said disc to center the latter.

13. In a device of the character described, a spindle designed to concentrically receive a thin cutting disc, a set of gripping elements having radially adjustable ends designed to engage the aforementioned cutting disc adjacent the periphery of the latter, and means for actuating said gripping elements to effect a substantially radial adjustment of said ends thereof.

14. In the combination defined in claim 13, there being means for convenient and instantaneous lateral shifting movement of said gripping elements into and out of engagement with the cutting disc.

In testimony whereof I affix my signature.

LEENDERT VERKUIL.